(12) United States Patent
Groenen et al.

(10) Patent No.: US 7,791,629 B2
(45) Date of Patent: Sep. 7, 2010

(54) EXPOSURE DEVICE, PRINTING APPARATUS EMPLOYING AN EXPOSURE DEVICE AND METHOD FOR ADJUSTING A NON-IMPACT PRINTING APPARATUS

(75) Inventors: Paulus A. C. Groenen, Venray (NL); Hendrikus G. M. Ramackers, St. Odilienberg (NL); Catharinus Van Acquoij, Venray (NL)

(73) Assignee: Océ-Technologies B.V., Venlo (NL)

( * ) Notice: Subject to any disclaimer, the term of this patent is extended or adjusted under 35 U.S.C. 154(b) by 535 days.

(21) Appl. No.: 11/154,586

(22) Filed: Jun. 17, 2005

(65) Prior Publication Data
US 2005/0280695 A1    Dec. 22, 2005

(30) Foreign Application Priority Data
Jun. 18, 2004    (EP)    ................... 04076783

(51) Int. Cl.
B41J 2/435    (2006.01)
B41J 2/47    (2006.01)
B41J 27/00    (2006.01)

(52) U.S. Cl. ................ 347/236; 347/237; 347/239; 347/246; 347/247; 347/258

(58) Field of Classification Search ................ 347/238, 347/258, 256, 225, 358, 236, 237, 239, 246, 347/247
See application file for complete search history.

(56) References Cited

U.S. PATENT DOCUMENTS

| | | | | |
|---|---|---|---|---|
| 4,920,376 A | * | 4/1990 | Sonoda | 355/38 |
| 5,612,767 A | * | 3/1997 | Iwama | 399/98 |
| 5,640,190 A | * | 6/1997 | Bollansee et al. | 347/240 |
| 5,914,744 A | * | 6/1999 | Ng | 347/237 |
| 5,933,682 A | * | 8/1999 | Rushing | 399/51 |
| 6,185,313 B1 | * | 2/2001 | Narayan et al. | 382/100 |

(Continued)

FOREIGN PATENT DOCUMENTS

EP    0 629 974 A1    12/1994

(Continued)

OTHER PUBLICATIONS

The World of Printers, Edition 6, May 2001.

*Primary Examiner*—Stephen D Meier
*Assistant Examiner*—Sarah Al-Hashimi
(74) *Attorney, Agent, or Firm*—Birch, Stewart, Kolasch & Birch LLP

(57) ABSTRACT

An exposure device for a non-impact printing apparatus which includes a plurality of light-emitting elements for forming images, a driver element for individually applying energy output levels to the light-emitting elements, lens for focusing the light emitted by the light-emitting elements, storage ability for storing a list of setting values for setting the energy output levels, wherein the list includes a plurality of series of setting values, each one of the series enabling to attribute at least one setting value to each one of the light-emitting elements, each one of the series being selectable as a function of an exposure device condition. A method is also provided for adjusting a non-impact printing apparatus which includes the step of selecting the most adequate series of setting values on the basis of an analysis of the optical density of printed images on a receiving medium.

10 Claims, 4 Drawing Sheets

U.S. PATENT DOCUMENTS

| | | | |
|---|---|---|---|
| 6,292,205 B1 * | 9/2001 | Nakayasu et al. | 347/131 |
| 6,607,863 B2 * | 8/2003 | Irie | 430/30 |
| 6,686,946 B2 * | 2/2004 | Masuda et al. | 347/236 |
| 2003/0007062 A1 * | 1/2003 | Wong et al. | 347/236 |
| 2004/0114026 A1 | 6/2004 | Kondo et al. | |
| 2004/0252182 A1 * | 12/2004 | Wakasugi | 347/251 |

FOREIGN PATENT DOCUMENTS

| | | |
|---|---|---|
| EP | 0 629 974 B1 | 12/1994 |
| EP | 1 278 367 A2 | 1/2003 |
| EP | 1 326 199 A2 | 7/2003 |
| EP | 1 422 067 A1 | 5/2004 |
| JP | 05-096783 A | 4/1993 |
| JP | 2003-291409 A | 10/2003 |

* cited by examiner

EXPOSURE DEVICE, PRINTING APPARATUS EMPLOYING AN EXPOSURE DEVICE AND METHOD FOR ADJUSTING A NON-IMPACT PRINTING APPARATUS This utility application claims priority under 35 U.S.C. §119(a) on Patent Application No. 04076783.2 filed in Europe on Jun. 18, 2004, the entire contents of which are hereby incorporated by reference.

BACKGROUND OF THE INVENTION

The present invention relates to non-impact printers employing an exposure device such as a printhead with a plurality of recording elements emitting light for recording latent images on a photosensitive recording member, such as an organic photoconductive (OPC) belt. Such a printer can be of the type using an exposure device with an array of recording sources such as light emitting diodes (LEDs). Lens means such as a rod lens array (commercially available under the trade-marked name SELFOC) can be used for focussing the light emitted by the LEDs on the photosensitive recording member. Printers of the above-mentioned type also comprise developing means for developing the latent image formed on the photosensitive member into a visual toner powder image. Such printers further comprise transfer means for transferring the toner powder image from the photosensitive recording member onto an image receiving medium such as a sheet of paper.

In printers of the above-mentioned type, the LEDs are mounted on a solid substrate and generally arranged in rows across the width of the photosensitive recording member. LEDs can be integrated on LED chips, each one of the chips containing, for example, a block of 128 integrated LEDs. A number of LED chips can be mounted on a module plate and several module plates can be mounted such that a print bar is formed whereon LEDs are spaced with a constant pitch.

Energy output levels are applied to the LEDs by associated drivers, in order to produce light spots on the photosensitive receiving member for producing an image made of picture elements (pixels). Spots having multiple energy levels are obtained by providing multiple levels of output power for a constant period of time, or by providing a constant output power level for a period of time proportional to the gradation value of a pixel. In so-called binary printers, only two possible energy levels can be applied to a LED, one level for giving rise to a light spot, the other level being a zero energy level. If a charge area development process is used, a light spot projected on the photosensitive member with a light intensity larger than a so-called print threshold intensity is discharging locally the photosensitive material and no toner is developed locally (no pixel). If a charge area development is used and a LED is not driven (zero-energy level), the photosensitive member remains locally charged and toner is locally transferred for giving rise to a pixel.

The unevenness of the optical density in images obtained with printers using such an exposure device comprising LEDs has to be minimised. The evenness of the optical density of a printed image is related to the features of the exposure intensity profile on the photosensitive member when LEDs are activated. Let us define the uniformity degree of an exposure intensity profile as the degree of regularity of the profile considered at the print threshold intensity when the LEDs are driven according to a regular scheme, for example, when pairs of LEDs in a row are driven alternatively. An important attribute of the exposure intensity profile on the photosensitive member is its uniformity degree because it directly relates to the evenness of the printed images. To reduce the unevenness of the optical density of printed images, the uniformity degree of an exposure intensity profile should be high. An exposure intensity profile with a low uniformity degree is caused, for example, by differing light intensity of the LEDs due to production process or material, temperature dependence of the LED light output yield and differing light transparency of the lens means (for example, a Selfoc lens array) across the print width. Another source for an exposure intensity profile with a low uniformity degree are local imperfections of the rod lens array, such as anomalous lens rod fibers or misaligned lens rod fibers. An exposure intensity profile with a low uniformity degree can also be caused by height differences of LEDs, or of LED-chips or of chip module plates.

An exposure device with an integrated alignment system for aligning the individual light intensities emitted by the LEDs to an equal intensity level is disclosed in the book entitled 'The World of Printers' published by Océ Printing Systems GmbH, edited by G. Goldmann, Mai 2001, under ISBN 3-00-001019-X. On page 13 of chapter 5 of said document, it is disclosed how to align the intensity distribution to ensure equal light intensity for all LEDs of a LED print bar. The various light intensities of the individual LEDs are measured by a photosensor mounted on a motor-driven guide block and being moved across the print width. From the light intensities measurements, corrective factors for the current values to be applied by the drivers to the LEDs are derived and stored in a memory.

SUMMARY OF THE INVENTION

The present invention concerns an exposure device comprising a plurality of light-emitting elements for forming images, driver means for individually applying energy output levels to the light-emitting elements, lens means for focussing the light emitted by the light-emitting elements, storage means for storing a list of setting values for setting said energy output levels.

Such an exposure device is known from EP 629 974 and can be used in a non-impact printing apparatus. Correction factors are stored, in the form of a number of look-up tables, for example. They are applied to obtain a list of setting values for setting the energy output levels to be applied to each one of the light-emitting elements for printing a pixel with a certain graduation level. The correction factors are directed to correcting undesired unevenness of the optical density of the produced images. However, due to spreading in the exposure device dimensions caused by manufacturing tolerances, the correction for obtaining the setting values for setting the energy output level of the light-emitting elements is operating properly only for exposure devices with relatively narrow mechanical and optical specifications, meaning that a significant proportion of exposure devices still has to be rejected.

The present invention seeks to provide an exposure device for use in a non-impact printing apparatus which ensures the formation of printed images with a reduced unevenness of the printed optical density, even for exposure devices with less narrow mechanical and optical specifications.

In accordance with the present invention, this object is accomplished in a exposure device of the above mentioned kind, wherein the list of setting values consists of a plurality of series of setting values, each one of said series enabling at least one setting value to be attributed to each one of the light-emitting elements, each one of said series being selectable as a function of an exposure device condition. A significant number of exposure devices qualify for implementation in a printing apparatus, since a reduced unevenness of the printed optical density is obtained by choosing the adequate series of values for setting the energy output level to be applied to the light-emitting elements, depending on exposure device conditions.

In a preferred embodiment of the exposure device according to the present invention, each one of said series of setting values results from measurements of the energy emitted by the light-emitting elements at a position of the exposure device defined with respect to a fixed reference plane, one distinct position being attributed to each one of said series. In this way, depending on the position of the exposure device with respect to a fixed reference plane, one series of setting values can be selected in order to obtain a reduced unevenness of the printed optical density. Exposure devices present spreading of their properties due to manufacturing tolerances. An exposure device of the prior art having less narrow mechanical and optical specifications and which LEDs are driven with a single series of setting values often produces printed images presenting optical density unevenness, which unevenness is more or less visible depending on the exposure device's mounting position with respect to the light receiving surface of the photosensitive recording member. Because small deviations of the exposure device's mounting position occur in a printing apparatus with respect to the ideal position, an exposure device of the prior art having less narrow mechanical and optical specifications would have to be rejected and finally, the production yield of such devices would be relatively poor. With an exposure device according to the present invention, the printed images are essentially free of optical density unevenness, since the most adequate series of setting values can be selected, depending on the exposure device's mounting position. Therefore, the production yield is significantly larger than the yield of exposure devices of the prior art.

The values for setting the energy output levels to be applied to the light-emitting elements may be current values to be applied by the drivers to the individual light-emitting elements. Current values can be set easily by means of adjustable current sources.

In one embodiment, the measurements of the energy emitted by the light-emitting elements at a position of the exposure device defined with respect to a fixed reference plane are profile measurements of the light intensity emitted by the light-emitting elements. In this way, the energy emitted by the light-emitting elements can be reliably determined at a given position of the exposure device. An exposure intensity profile with a high degree of uniformity is thus achieved.

In another embodiment of the exposure device according to the present invention, the measurements of the energy emitted by the light-emitting elements at a position of the exposure device defined with respect to a fixed reference plane are based on an analysis of printed areas consisting of pixels on an image receiving medium, said analysis establishing a relationship between the optical density at a pixel position and the energy output level applied to a light-emitting element. Such measurements are easily carried out and give reliable results.

The lens means for focussing the light emitted by the light-emitting elements are preferably in the form of a rod lens array. Further, the storage means for storing the list of setting values may be in the form of a non-volatile memory.

The present invention further relates to a printing apparatus comprising an exposure device, and more particularly to a printing apparatus of the type comprising a photosensitive recording member for recording a latent image formed by the light-emitting elements of the exposure device, developing means for developing said latent image into a toner powder image and transfer means for transferring said toner powder image onto an image receiving medium. In a printing apparatus provided with an exposure device according to the present invention, the occurrence of optical density unevenness in printed images is strongly reduced.

The present invention also relates to a method for adjusting a non-impact printing apparatus. Adjusting an non-impact printing apparatus is required when an exposure device is mounted for the first time in a printing apparatus. It may also be required in other circumstances such as after the replacement of the photosensitive recording member. After such a replacement, optical density unevenness in printed images sometimes occurs. For example, banding is apparent on printed areas, which banding may be caused by the non-uniformity of the exposure intensity profile received on the photosensitive member over the print width.

A method for adjusting a non-impact printing apparatus is known from U.S. Pat. No. 4,998,118, wherein corrective measurements are performed during the life time of the exposure device having a plurality of light emitters. The method known from U.S. Pat. No. 4,998,118 comprises the steps of imaging light from the emitters for producing a recording on a photosensitive film, simultaneously imaging light from the emitters upon a light sensing means, and generating signals related to the intensity or amount of light sensed by said sensing means; and in response to these signals, adjusting the level of current and duration of an exposure period for energizing an emitter. The drawback of the known method is that the step of simultaneously imaging light upon a light sensing means requires the use of a light sensing means like a CCD sensor. Such a device is expensive, and moreover, the known method for adjusting a non-impact printing apparatus is time consuming.

The present invention provides a method for adjusting a non-impact printing apparatus in which these problems are mitigated. In a printing apparatus using an exposure device according to the present invention, the method for adjusting a non-impact printing apparatus comprises the step of selecting a most adequate series of setting values on the basis of an analysis of the optical density of printed images on a receiving medium. Adjusting the printing apparatus can thus be achieved in a more efficient way. Particularly, after the replacement of the exposure device or of the photosensitive receiving member, the distance between the exposure device and the surface of the photosensitive may have slightly changed compared to the distance before replacement. Instead of attempting to adjust very accurately the distance between the exposure device and the photosensitive member, which would be time consuming and require the use of high precision mechanical tools, a series of setting values can be selected in the list of setting values, dependent on the visual aspect of images printed on a receiving medium like a sheet of paper.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
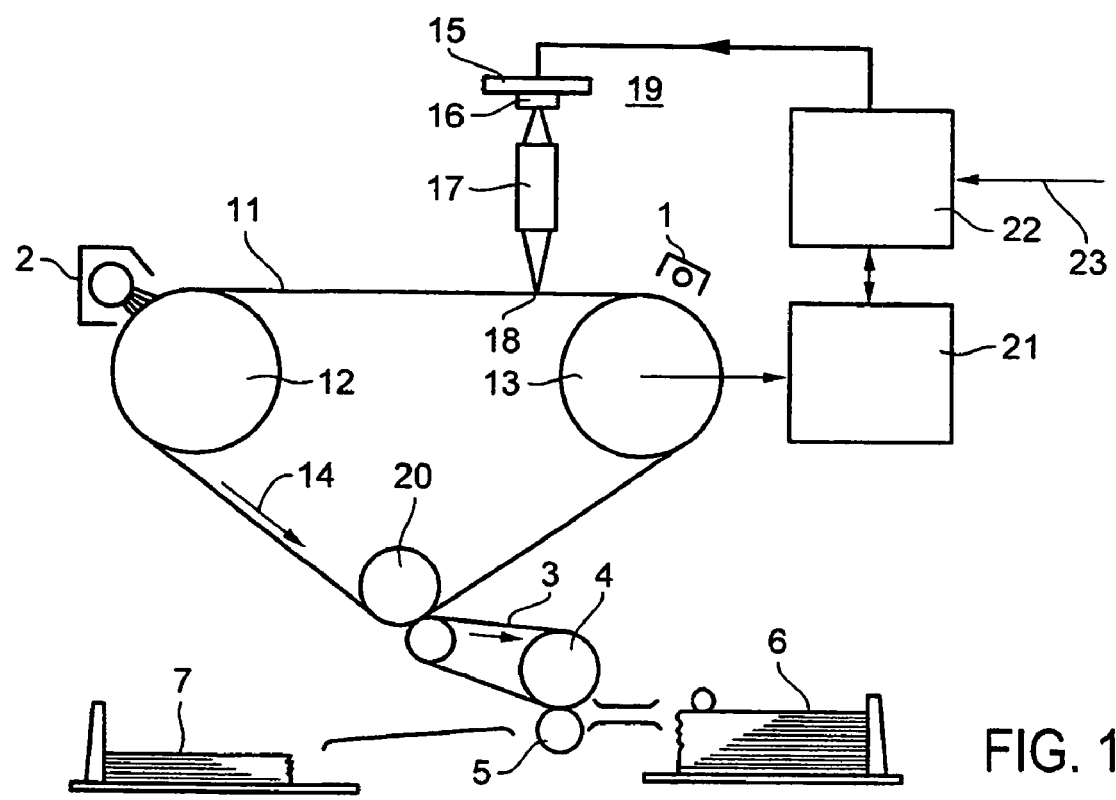
FIG. 1 diagrammatically illustrates a printer using a linear array of LEDs.

FIG. 1 is a diagrammatic illustration of a printer in which an electrophotographic belt 11 is passed about three rollers 12, 13 and 20 in the direction of arrow 14. A belt of this kind, for example, provided with a zinc oxide layer or an organic photosensitive layer, is charged in a known manner by means of a charging unit 1 and then exposed image-wise by an exposure device 19. The places of the belt 11 which have not received light are developed with toner powder by means of a developing device 2. The resulting powder image is transferred in a known manner to a heated silicone rubber belt 3. A sheet of receiving material is passed from a sheet tray 6 between rollers 4 and 5, and the powder image is transferred from the silicone rubber belt 3 to the receiving sheet on which it is fused. The resulting print is deposited in a collecting tray 7. The exposure device 19 comprises a rod lens array 17 and a carrier 15 with a row of LEDs 16 extending perpendicularly to the direction of advance of the belt 11 and mounted above the belt 11. An array of imaging glass fibers (rod lens array) 17 is mounted between the LEDs 16 and the belt 11 and images each spot light emitted by a LED with an imaging ratio 1:1 on the electrophotographic belt 11 (point 18). An image signal is fed via line 23 to an energizing device 22. A pulse disc is disposed on the shaft of roller 13 and delivers a signal in proportion to the movement of belt 11. This signal is fed to a synchronization device 21 in which a synchronization signal is generated. The image signals are fed to the exposure device 19 in response to the synchronization signal so that the electrophotographic belt 11 is exposed line by line image-wise, so that a row of image dots is formed on the belt 11.

Figure 2:
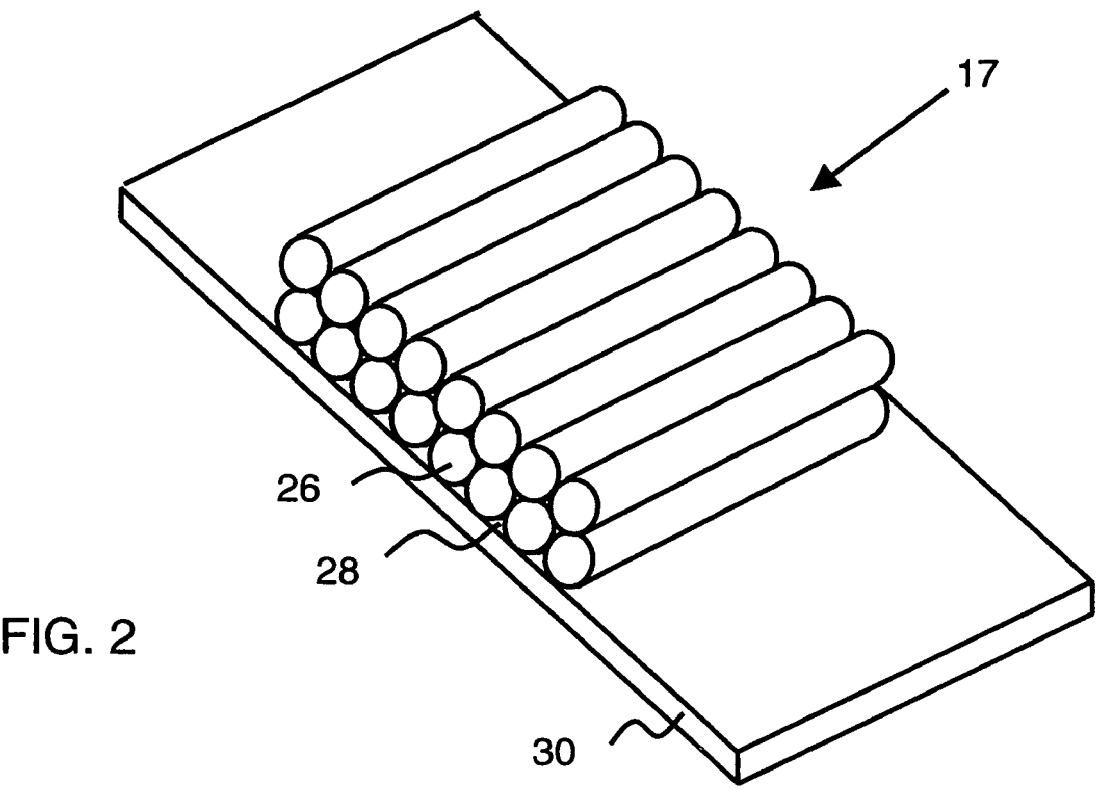
FIG. 2 diagrammatically illustrates a rod lens array used in a printer using a linear array of LEDs.
Figure 3:
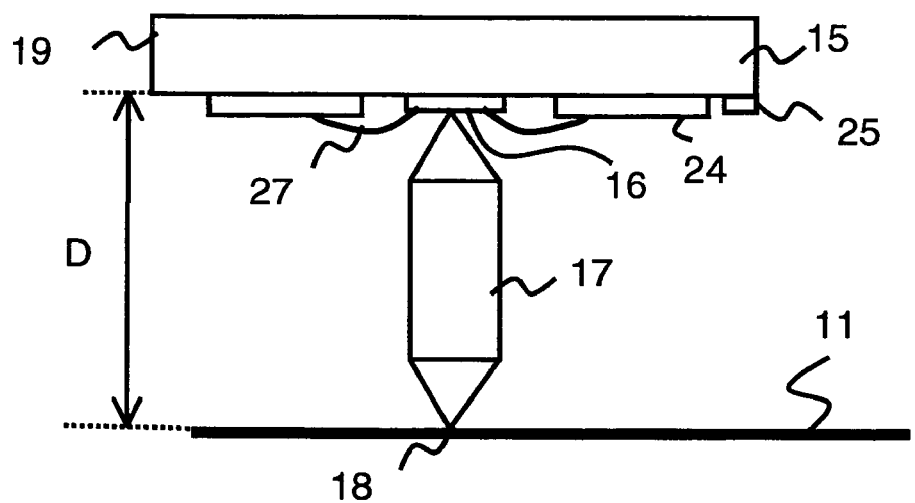
FIG. 3 diagrammatically illustrates a exposure device using a linear array of LEDs and a rod lens array.

FIG. 2 is a diagrammatic illustration of a rod lens array 17, such as a Selfoc lens array, used in exposure device 19 such as the one shown in FIG. 3 for imaging the light emitted by the LEDs on the electrophotographic belt. Individual graded index optical fibers 26 are bounded into an array, for example in a two line configuration. An adhesive member 28 such as an opaque silicone resin may be used to fill the gaps between individual glass fibers 26 to make them hold together. To strengthen the structure, the array of optical fibers may be pinched by two side plates 30 of which only one is shown in the drawing.

FIG. 3 is a diagrammatic illustration of an exposure device 19 used in a printer shown in FIG. 1, comprising an exposure device with a substrate 15 on which a number of LED chips containing LEDs 16 and LED drivers 24 is disposed, and a rod lens array 17. A LED chip may be provided with a large number of LEDs, for example 128 or 192. An exposure device may comprise 40 to 60 LED chips, on which the LEDs are regularly positioned. The LED chips are positioned on the substrate 15 in such a way that a row of individually operable light sources with a constant LED pitch is formed, the LED pitch being for example 42.3 μm for an exposure device with a line resolution of 600 dpi. The total number of LEDs in the exposure device is N and the LEDs are individually numbered from 1 to N. Each one of the drivers 24 operates an associated LED with an adjustable current, which is fed via the conductor 27. The drivers can be positioned in two rows, as is shown in FIG. 3; the drivers in one row operating the LEDs with an even number, the drivers in the other row operating the LEDs with an uneven number. The current value is adjustable for each individual LED. A non-volatile memory 25 is provided for storing a list comprising the current setting values for driving each individual LED. The rod lens array 17 is used to focus the light emitted by the LEDs 16 on the photosensitive recording member 11. The exposure device 19 is mounted at a certain position in the printing apparatus. The distance D between the exposure device 19 and the surface of the photosensitive recording member 11 is indicated in FIG. 3. In this whole document, D is the shortest distance from the substrate surface on which the LED chips are mounted to the surface of the photosensitive member on which the light is projected. The photoconductor 11 is exposed line by line image-wise, so that a row of images dots 18 is formed on the belt.

Figure 4A:
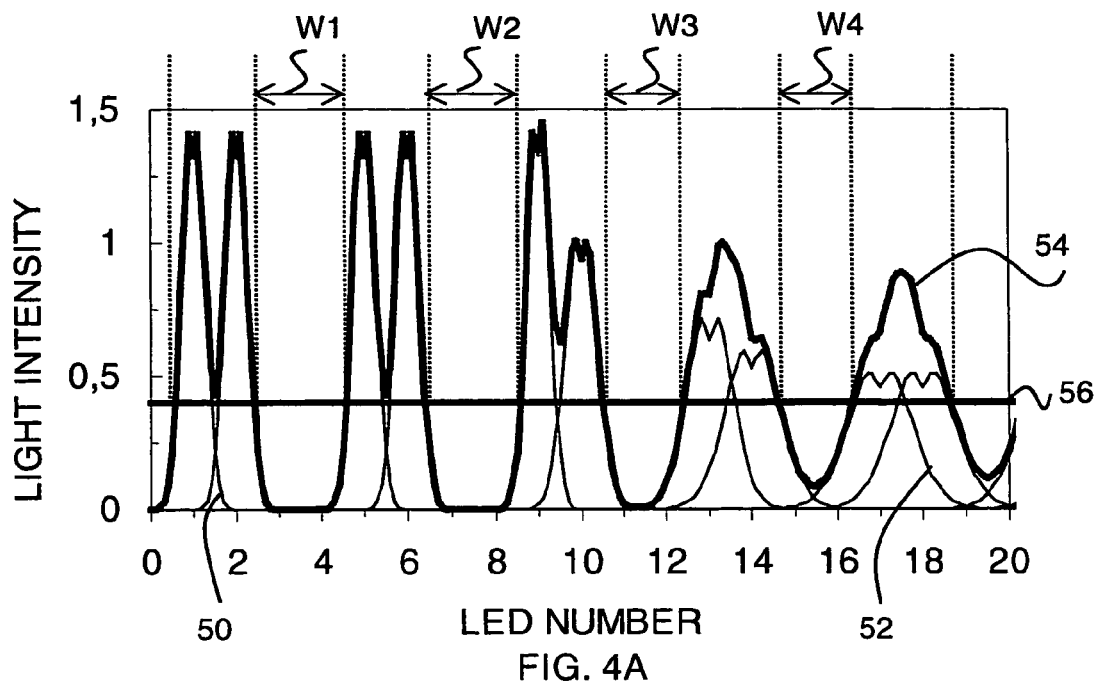
FIG. 4A diagrammatically illustrates the light intensity profile formed on the surface of a photosensitive recording member for a row of LEDs.
Figure 4B:
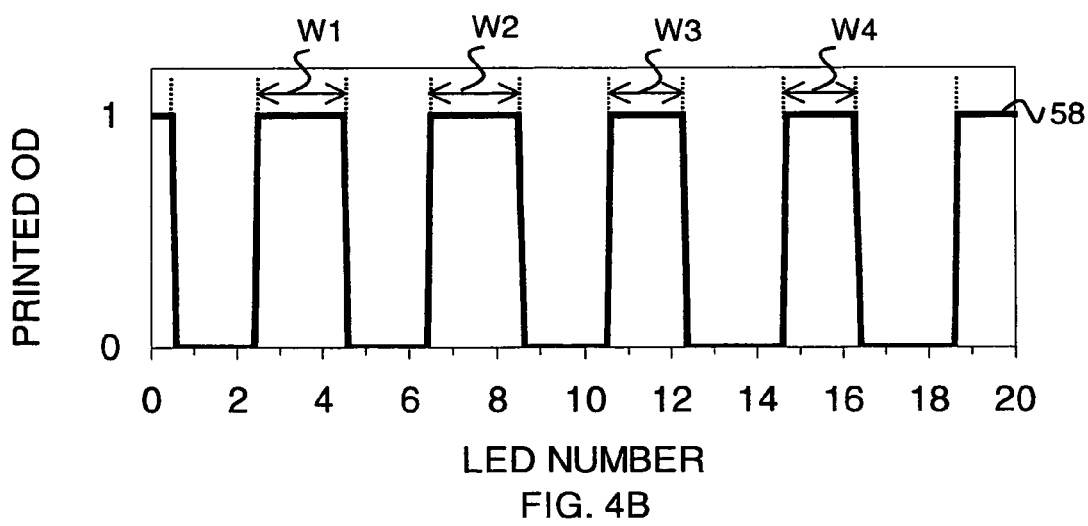
FIG. 4B diagrammatically illustrates the corresponding printed optical density.

Usually, exposure devices provided with a number of LEDs and a rod lens array present local disturbances mainly due to manufacturing tolerances. Due to such local disturbances, the produced exposure intensity profile has a low uniformity degree, which is at the origin of the unevenness of the printed optical density. An example of an exposure intensity profile with a low uniformity degree is illustrated in FIG. 4A which represents the light intensity profile for a number of LEDs in a direction perpendicular to the transport direction of the photosensitive belt. In this example, pairs of LEDs are alternatively driven: the LEDs numbered 1 and 2 are driven, LEDs numbered 3 and 4 are not, LEDs numbered 5 and 6 are driven and so on. The individual light intensity profile received on the photoconductor's surface for each one of the driven LED is represented by a thin black line. The intensity profile of the LED numbered 1 is indicated by the thin black line referenced 50, while the intensity profile of the LED numbered 17 is indicated by the thin black line referenced 52. The total light intensity profile received on the surface of the photosensitive member is represented by the thick black line 54. At the places where the total light intensity is larger than the print threshold intensity 56, the photosensitive recording member is locally discharged and no toner is transferred, and the printed optical density is therefore zero. On the other hand, if the total light intensity is smaller than the print threshold intensity 56, the photosensitive recording member remains locally charged and toner is developed at these places, and the printed optical density is one. The total light intensity profile should be ideally regular because pairs of LEDs are alternatively driven in the shown example. Some individual light intensity profiles are close to the ideal expected shape, like the intensity profile 50, while other profiles are disturbed, like the profile 52. Due to this non-uniformity of the individual profiles, the profile widths at the threshold intensity W1, W2, W3 and W4 are not equal to each other, i.e. the exposure intensity profile has a low degree of uniformity. The widths W1, W2, W3 and W4 correspond to local areas on the photoconductor which are not illuminated. The non-uniformity of the widths of the non-exposed areas is visible on the corresponding printed optical density profile 58 shown in FIG. 4B. The widths W1, W2, W3 and W4 of the corresponding printed dots are not equal to each other, while they ideally should be in the shown example. This phenomenon is referred to as unevenness of the printed optical density.

The unevenness of the printed optical density may give rise to the phenomenon of banding observed in some printed areas of an image in the transport direction of the photoconductor belt 11. An example of a printed image wherein banding occurs is illustrated schematically in FIG. 5A. The printed image 40, obtained using the whole print width of the exposure device, contains a first sub-area 42 printed with a grey level reaching 35%, a second sub-area 44 with a grey level reaching 50% and a third sub-area 46 with a grey level reaching 65% of the maximum coverage. In a so-called binary printer, the desired grey level is obtained by printing according to an appropriate dither-matrix. The arrow 48 indicates the transport direction of the photosensitive belt. The phenomenon of banding is indicated schematically by the unwanted white areas 60, 62 and 64.

The non-uniformity of the exposure intensity profile may be corrected by adjusting individually the current setting values for each one of the LEDs. As seen in FIG. 3, the exposure device is provided with a non-volatile memory 25 for storing a list comprising current setting values for operating each one of the individual LEDs. The list consists of a plurality of series of current values for operating the LEDs, for example five series identified by the codes S1, S2, S3, S4 and S5. Each one of the series enables to attribute a current setting value to operate to each one of the N LEDs. In a so-called binary printer, the current value is applied in order to bring a LED in an activated state in order to form a light spot on the photosensitive recording member. The series S1 comprises the current setting values $I_{1,1}, I_{1,2}, \ldots, I_{1,N}$, the first index referring to the series label and the second index identifying the LED number to which the current value is to be applied. The series S2 comprises the current setting values $I_{2,1}, I_{2,2}, \ldots, I_{2,N}$ and so on until the series S5 comprising the current setting values $I_{5,1}, I_{5,2}, \ldots, I_{5,N}$. Each one of the five series is selectable, for example by an operator turning a selection button or using dedicated software. When a series is selected, the current values of said series are applied by the drivers to operate the LEDs, and it is possible to print images in a printing apparatus such as shown in FIG. 1, provided with an exposure device according to the invention.

Due to mechanical tolerances in the mounting position of the exposure device in the printing apparatus, the distance D between the exposure device and the surface of the recording photosensitive member is not exactly specified. It may for example be between (F−50) μm and (F+50) μm, F being the ideal distance. Each one of the series S1, S2, S3, S4, S5 comprises current setting values such that the banding vanishes when D is provided within a pre-defined range. The series which is to be selected for having the banding vanishing depends on the distance of the exposure device to the surface of the photosensitive recording member. When D is between (F−50) μm and (F−30) μm and the series S1 is selected, the unevenness of the optical density in the obtained images is strongly reduced and the related banding effects are essentially absent. In a similar fashion, when D is between (F−30) μm and (F−10) μm and the series S2 is selected, the unevenness of the printed optical density is strongly reduced. The same effect is observed when S3 is selected and D is between (F−10) μm and (F+10) μm, or when S4 is selected and D is between (F+10) μm and (F+30) μm, or when S5 is selected and D is between (F+30) μm and (F+50) μm.

The current values in the series S1, S2, S3, S4 and S5 may be obtained from light intensity profile measurement performed on the exposure device as described hereinafter. It is known to adjust individually the current setting values supplied by the N drivers to each one of the N LEDs in order to obtain a uniform intensity profile of the light emitted by an exposure device. The uniformity adjustment of the current setting values can be performed outside a printing apparatus, for example before mounting the exposure device inside the printer. The adjusted current setting values are based on profile measurements of the light intensity emitted by the light-emitting elements. The intensity profile of the light emitted by the exposure device can be measured across the print width of the exposure device by a photosensitive sensor like a CCD sensor at a certain distance from the LEDs emitting surface. The individual current values are adjusted until an exposure intensity profile with a high degree of uniformity is obtained at said distance and stored in memory means like the non-volatile memory 25. For obtaining each one of the series S1, S2, S3, S4 and S5, the distance at which the measuring surface of photosensitive sensor is placed from the emitting surface of the LEDs during the measurements is, respectively, (F−40) μm, (F−20) μm, F, (F+20) μm, and (F+40) μm.

Figure 5A:
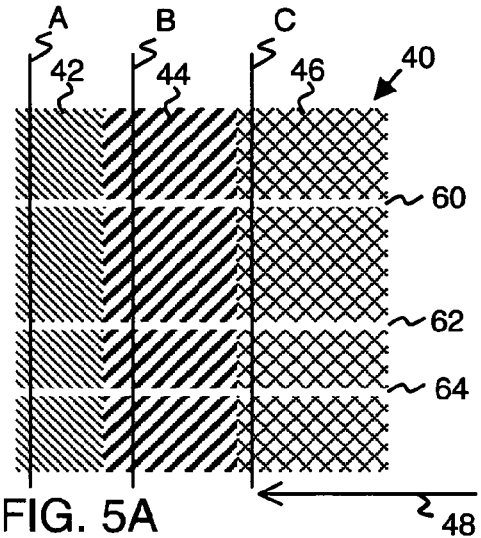
FIGS. 5A, 5B, 5C, 5D and 5E diagrammatically illustrate images printed for adjusting a printing apparatus.
Figure 5B:
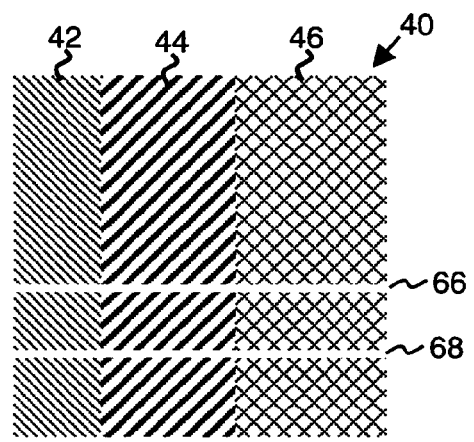
Figure 5C:
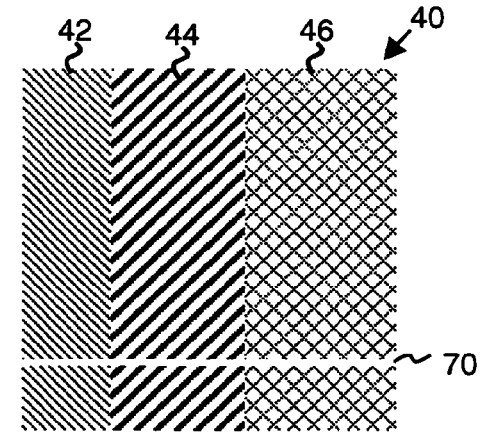
Figure 5D:
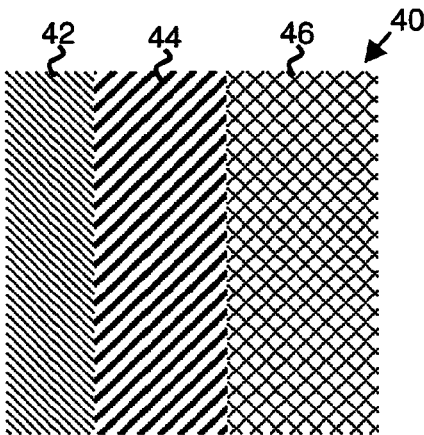
Figure 5E:
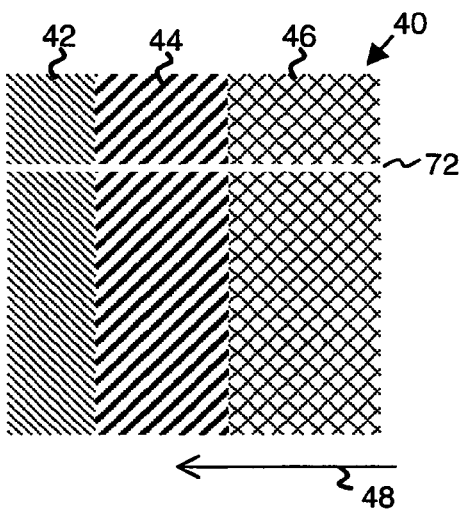

The current values in the series S1, S2, S3, S4 and S5 may also be obtained from measurements based on an analysis of printed areas consisting of pixels on an image receiving medium, said analysis establishing a relationship between the optical density at a pixel position and the energy output level applied to a light-emitting element. Such measurements can be performed in a reference printing apparatus of the same type as the printing apparatuses for which the exposure device is adapted. Such measurement consists in printing an image on a sheet of paper and to analyze the optical density profile of the printed image along the lines A, B and C such as shown in FIG. 5A, said lines being perpendicular to the transport direction 48 of the photosensitive recording member. Such an analysis can be performed with a photosensitive sensor capable of showing the optical density profile of a printed image along a line. By adjusting the current values applied to the LEDs, it is possible to obtain areas having a uniform optical density in printed images and to make the stripes vanish.

In multi-level gradation printers, light spots having multiple energy levels can be obtained by providing multiple levels of output power for a constant period of time. In exposure devices adapted for such printing apparatus, each one of the series of the list comprises a number of current values to be applied to each one of the LED. For example the series S1 comprises the values $I_{1,1,1}, I_{1,1,2}, \ldots, I_{1,1,G}, I_{1,2,1}, I_{1,2,2}, \ldots, I_{1,2,G}, \ldots, I_{1,N,1}, I_{1,N,2}, \ldots, I_{1,N,G}$. The first index indicates the series, the second index indicates the number of the LED to which the current is to be applied, and the last index indicates the gradation level obtained, from 1 to G. Each one of the series is obtained by light profile measurements at a pre-defined distance from the emitting surface of the LEDs, in a similar way as explained above for an exposure device adapted for use in a binary printer. The current values are adjusted in such a way to obtain the desired light profile at chosen distances, respectively (F−40) μm, (F−20) μm, F, (F+20) μm, and (F+40) μm for the series S1, S2, S3, S4 and S5.

To adjust a non-impact printing apparatus containing an exposure device according to the present invention, the most adequate series of setting values is selected on the basis of an analysis of the optical density of printed images on a receiving medium. FIGS. 5A, 5B, 5C, 5D and 5E represent a similar image 40 printed on a receiving medium when the selected series of setting values for setting the current levels to be applied to the N LEDs is, respectively, S1, S2, S3, S4 and S5. The printed image 40 comprises the areas 42, 44, 46 which have a different grey level. The arrow 48 indicates the transport direction of the photosensitive belt, the direction being the same for all shown images. In FIG. 5A, the series of setting values S1 is selected and the image 40 is printed. On the printed image 40 shown in FIG. 5A, three unwanted stripes 60, 62 and 64 are visible. On the printed image 40 shown in FIG. 5B (series S2 selected), two unwanted stripes 66 and 68 are visible. On the printed image 40 shown in FIG. 5C (series S3 selected), only one unwanted stripe 70 is visible. On the printed image 40 shown in FIG. 5D (series S4 selected), no unwanted stripe is visible and the printed optical density is essentially even within each one of the sub-areas. On the printed image 40 (series S5 selected) shown in FIG. 5E, one unwanted stripe 72 is visible. From a visual inspection of the printed images, it appears that the series S4 is the most adequate series to be selected in order to obtain printed images without banding.

Depending on the expected spreading in the D values, it is also possible to add series with correction values corresponding for example to D having the value (F+30) µm at one side of the photosensitive member and to D having the value (F−30) µm at the other side.

The invention being thus described, it will be obvious that the same may be varied in many ways. Such variations are not be regarded as a departure from the spirit and scope of the present invention, and all such modifications as would be obvious to one skilled in the art are intended to be included within the scope of the following claims.

What is claimed is:

1. An exposure device which comprises:
   a plurality of light-emitting elements for forming images;
   driver means for individually applying energy output levels to the light-emitting elements;
   lens means for focussing the light emitted by the light-emitting elements;
   storage means for storing a list of setting values for setting said energy output levels;
   wherein
   said list of setting values consists of a plurality of series of setting values, each one of said series enabling to attribute at least one setting value to each one of the light-emitting elements, each one of said series being selectable as a function of an exposure device condition, and wherein each one of said series of setting values results from measurements of the energy emitted by the light-emitting elements at a position of the exposure device relative to a light receiving surface of a photosensitive recording member, one distinct position being attributed to each one of said series.

2. The exposure device according to claim 1 wherein the values for setting the energy output levels to be applied to the light-emitting elements are current values to be applied by the drivers to the individual light-emitting elements.

3. The exposure device according to claim 1, wherein said measurements are profile measurements of the light intensity emitted by the light-emitting elements.

4. The exposure device according to claim 1, wherein said measurements are based on an analysis of printed areas consisting of pixels on an image receiving medium, said analysis establishing a relationship between the optical density at a pixel position and the energy output level applied to a light-emitting element.

5. The exposure device according to claim 1, wherein the lens means for focussing the light emitted by the light-emitting elements is in the form of a rod lens array.

6. The exposure device according to claim 1, wherein the storage means for storing the list of setting values is in the form of a non-volatile memory.

7. A printing apparatus containing the exposure device of claim 1 and further comprising selection means for selecting one of said series of setting values as a function of a exposure device condition.

8. The printing apparatus according to claim 7, comprising a photosensitive recording member for recording a latent image formed by the light-emitting elements of the exposure device, developing means for developing said latent image into a toner powder image and transfer means for transferring said toner powder image onto an image receiving medium.

9. A method for adjusting a non-impact printing apparatus containing an exposure device which comprises:
   providing a plurality of light-emitting elements for forming images;
   individually applying energy output levels to the light-emitting elements;
   focusing the light emitted by the light-emitting elements; and
   storing a list of setting values for setting said energy output levels; and
   providing a plurality of series of setting values, each one of said series enabling to attribute at least one setting value to each one of the light-emitting elements, and selecting each one of said series as a function of an exposure device condition, wherein each one of said series of setting values results from measurements of the energy emitted by the light-emitting elements at a position of the exposure device relative to a light receiving surface of a photosensitive recording member, one distinct position being attributed to each one of said series.

10. The method of claim 9, further comprising, selecting a most adequate series of setting values on the basis of an analysis of the optical density of printed images on a receiving medium.

* * * * *